(12) United States Patent
Shpantzer

(10) Patent No.: US 8,532,498 B2
(45) Date of Patent: Sep. 10, 2013

(54) SECURE ORTHOGONAL FREQUENCY MULTIPLEXED OPTICAL COMMUNICATIONS

(75) Inventor: Isaac Shpantzer, Bethesda, MD (US)

(73) Assignee: Celight, Silver Spring, MD (US)

( * ) Notice: Subject to any disclaimer, the term of this patent is extended or adjusted under 35 U.S.C. 154(b) by 243 days.

(21) Appl. No.: 13/070,719

(22) Filed: Mar. 24, 2011

(65) Prior Publication Data

US 2011/0170690 A1 Jul. 14, 2011

Related U.S. Application Data

(63) Continuation-in-part of application No. 12/028,121, filed on Feb. 8, 2008, now Pat. No. 7,945,174, and a continuation-in-part of application No. 12/045,765, filed on Mar. 11, 2008, now Pat. No. 8,064,767.

(51) Int. Cl.
*H04B 10/00* (2013.01)

(52) U.S. Cl.
USPC .............. 398/184; 398/79; 398/140; 398/185

(58) Field of Classification Search
USPC .......................... 398/140–172, 76, 182–191
See application file for complete search history.

(56) References Cited

U.S. PATENT DOCUMENTS

| | | | | |
|---|---|---|---|---|
| 5,638,361 A * | 6/1997 | Ohlson et al. | ................... | 370/342 |
| 5,917,634 A * | 6/1999 | Otobe | ........................... | 398/201 |
| 6,111,675 A * | 8/2000 | Mao et al. | ........................ | 398/7 |
| 6,584,140 B1 * | 6/2003 | Lee | ................................ | 375/132 |
| 7,012,912 B2 * | 3/2006 | Naguib et al. | ................ | 370/343 |
| 7,076,168 B1 * | 7/2006 | Shattil | .............................. | 398/76 |
| 7,076,169 B2 * | 7/2006 | Shpantzer et al. | ............... | 398/76 |
| 7,230,908 B2 * | 6/2007 | Vanderaar et al. | ............. | 370/203 |
| 7,286,609 B2 * | 10/2007 | Maltsev et al. | ................ | 375/267 |
| 7,324,755 B2 * | 1/2008 | Izadpanah | ........................ | 398/78 |
| 7,330,661 B1 * | 2/2008 | Jackson et al. | ................. | 398/118 |
| 7,406,261 B2 * | 7/2008 | Shattil | ............................. | 398/76 |
| 7,469,106 B2 * | 12/2008 | Feced et al. | .................... | 398/202 |
| 7,471,903 B1 * | 12/2008 | Friskney et al. | ............... | 398/185 |
| 7,558,310 B1 * | 7/2009 | von der Embse | ............. | 375/130 |
| 7,580,630 B2 * | 8/2009 | Kee et al. | ......................... | 398/25 |
| 7,580,643 B2 * | 8/2009 | Moore et al. | ................... | 398/202 |
| 7,656,931 B2 * | 2/2010 | Smith et al. | ..................... | 375/131 |
| 7,711,028 B2 * | 5/2010 | Saidi | .............................. | 375/132 |
| 7,742,701 B2 * | 6/2010 | Taylor | ............................. | 398/83 |
| 7,796,898 B2 * | 9/2010 | Armstrong | .................... | 398/193 |
| 7,904,723 B2 * | 3/2011 | Shin et al. | ....................... | 713/176 |
| 7,908,625 B2 * | 3/2011 | Robertson et al. | ............. | 725/82 |
| 7,949,254 B1 * | 5/2011 | Stevens | .......................... | 398/40 |
| 7,969,205 B2 * | 6/2011 | Nagatani et al. | ............... | 327/105 |

(Continued)

*Primary Examiner* — Agustin Bello
(74) *Attorney, Agent, or Firm* — Nadya Reingand

(57) ABSTRACT

The invention provides a system and method for secure communication that involve encoding and transmitting an optical orthogonal frequency division multiplexed (OFDM) signal. Each subcarrier of an optical carrier in OFDM transmission is modulated with data individually, and a variety of data format are used, such as QPSK, OOK, QAM, etc. The data format of each subcarrier may change in time according to a predetermined pattern. An optical receiver uncovers the data transmitted via an optical link. It is based on a coherent optical receiver and a digital signal processing (DSP) unit. A key to the data mapping and change is transmitted via the same optical link or by a separate channel. In one embodiment, the key is transmitted using quantum encryption technique. Besides subcarrier modulation encoding, the system may provide additional layers of security: optical carrier frequency hopping and polarization scrambling.

17 Claims, 4 Drawing Sheets

(56) References Cited

U.S. PATENT DOCUMENTS

| | | | |
|---|---|---|---|
| 8,000,604 B2* | 8/2011 | Qian et al. | 398/89 |
| 8,005,222 B2* | 8/2011 | Ito et al. | 380/270 |
| 8,055,136 B2* | 11/2011 | Pescod et al. | 398/115 |
| 8,223,691 B2* | 7/2012 | Cheng et al. | 370/328 |
| 2002/0101632 A1* | 8/2002 | Meckler | 359/115 |
| 2002/0145787 A1* | 10/2002 | Shpantzer et al. | 359/136 |
| 2002/0186435 A1* | 12/2002 | Shpantzer et al. | 359/136 |
| 2004/0018018 A1* | 1/2004 | Izadpanah | 398/77 |
| 2004/0131011 A1* | 7/2004 | Sandell et al. | 370/210 |
| 2005/0074037 A1* | 4/2005 | Rickard et al. | 370/537 |
| 2005/0152465 A1* | 7/2005 | Maltsev et al. | 375/260 |
| 2005/0220301 A1* | 10/2005 | Svozil | 380/41 |
| 2005/0271387 A1* | 12/2005 | Kee et al. | 398/140 |
| 2006/0156009 A1* | 7/2006 | Shin et al. | 713/176 |
| 2006/0192672 A1* | 8/2006 | Gidge et al. | 340/538.11 |
| 2007/0030883 A1* | 2/2007 | Saidi | 375/133 |
| 2011/0134967 A1* | 6/2011 | Grob et al. | 375/146 |
| 2011/0170690 A1* | 7/2011 | Shpantzer | 380/256 |

* cited by examiner

Subcarriers

Carriers

Carriers

SECURE ORTHOGONAL FREQUENCY MULTIPLEXED OPTICAL COMMUNICATIONS

CROSS-REFERENCE TO RELATED APPLICATIONS

This application is a continuation-in-part of U.S. patent application Ser. No. 12/028,121 filed Feb. 8, 2008 now U.S. Pat. No. 7,945,174 and also a continuation-in-part of U.S. patent application Ser. No. 12/045,765 filed Mar. 11, 2008, now U.S. Pat. No. 8,064,767 both of which are fully incorporated herein by reference.

FIELD OF THE INVENTION

The invention relates to a system and method for secure data transmission using encoding techniques. More specifically, the invention relates to implementation of coherent detection to recover information from the encoded optical signal transmitted using orthogonal frequency division multiplexed format.

BACKGROUND OF THE INVENTION

Optical communications are usually either free-space systems, or systems using waveguides, such as optical fibers or the like. Typically, when the security of information being communicated by way of an optical communications system is of high importance, one or more security layers may be added to the communications signal to protect the integrity and authenticity of the data. For example, data encryption and user authentication are two security layers commonly used in today's communications networks. Data encryption techniques are often used to encode a data stream (e.g., a data stream transmitted by way of a communications signal), preventing users who do not have the proper decryption algorithm from decoding the encoded information transmitted by way of the communications network.

User authentication, on the other hand, involves procedures and/or technologies that are implemented to prevent unauthorized users from gaining access to confidential data. Although both of these techniques help maintain the integrity and authenticity of data transmitted by way of optical communications networks, they both have problems, and may not be sufficient for use in systems where the integrity, confidentiality, and/or authenticity of the data being communicated is of the utmost importance.

For example, standard data encryption algorithms can be broken by powerful computers or advanced computer algorithms. A user employing such resources could intercept encoded communications signals, record the signals, and later decode the signals. As these resources become more readily available and more powerful, the threat to maintaining the integrity and confidentiality of encoded communications signals Increases.

Additionally, although user authentication procedures are often sufficient to ensure that sensitive data is secured at a receiving end of a communications link, they generally do not prevent a hostile user from intercepting communication signals while they are being transmitted. Such unauthorized interceptions of communication signals are difficult to detect, and can be accomplished by way of standard equipment that is readily available, either commercially or otherwise, to would-be data interceptors.

Accordingly, it would be desirable to provide one or more additional security layers that allow for additional security of communications signals being transmitted in a communications system or network. Specifically, it would be desirable to provide additional encryption to information being communicated by way of optical communications systems, which provides security layers that exceed the security of standard data encryption and user authentication.

SUMMARY

The present invention addresses a multidimensional encoding technique, which provides several layers of security.

In one embodiment, a secure optical communication system is disclosed with orthogonal frequency division multiplexed format for data modulation. Each channel optical carrier has multiple electronic subcarriers, and each subcarrier is individually encoded with data. The data encoding format, such as BPSK, QPSK, QAM, OOK, etc., is different for different subcarriers. The data is sent to the receiver via fiber link or free space. At the receiver side, the signal is converted to baseband in a coherent optical receiver. The output electrical signal from the optical receiver is processed in a digital signal processing (DSP) unit to recover data from each subcarrier. Obviously, the DSP unit has to have information about the type of data format in each subcarrier. This information is either known in advance or can be transmitted to the receiver via the same link or by a separate key channel. In one embodiment, the key channel implements quantum encryption for transmission of the key sequence without eavesdropping.

The data encoding format of each subcarrier may change in time according to a pattern.

This system may operate with data transmission using an optical beam having two polarization states.

To enhance the system security, the optical carrier frequency may change in time according to a sequence of wavelength change keys. When the signal enters the receiver, it is mixed with a local oscillator beam. The wavelength of the local oscillator beam has a wavelength corresponding to the wavelength of the incoming carrier.

Another object of the present invention is a method for secure data transmission. The method implements OFDM optical signal transmission with optical carrier comprising a number of subcarriers, each subcarrier is modulated with data individually. The data encoding format, such as BPSK, QPSK, QAM, OOK, etc., is different for different subcarriers. When the signal reaches a receiver side, it is converted to the baseband in a coherent optical receiver, and the data is recovered from each subcarrier using a digital signal processing (DSP).

BRIEF DESCRIPTION OF THE DRAWINGS

The invention is discussed below in reference to the drawings in which like parts are indicated by like reference designators.

DETAILED DESCRIPTION OF THE PREFERRED EMBODIMENT

To facilitate an understanding of the principles and features of the invention, it is explained hereinafter with reference to its implementation within illustrative embodiments.

According to embodiments of the invention, a system and method for secure data transmission via optical link is disclosed. Light encoding uses the fact that the transmission is performed using OFDM (orthogonal frequency division multiplexing). This type of optical communications was disclosed in U.S. Ser. No. 12/137,352 and Ser. No. 12/045,765 of the same inventive entity.

Orthogonal frequency division multiplexing is widely used technique of transmission in the RF domain where it allows mitigating signal fading in multi-path propagation. The present invention discloses the use of orthogonal frequency division multiplexing in optical links and, in particular, in fiber communications and in free-space communications including line-of-sight and non-line-of-sight communications.

In optical OFDM systems each WDM channel the optical carrier is directly modulated by a complex RF signal that can be construed as a linear combination of M separate digitally modulated RF signals at frequencies $f_m$. Thus the total symbol rate of the transmitted information is M/T, where T is the period of modulation. In the text we shall refer to the frequencies $f_m$ as "subcarriers". We would like to make emphasis that those subcarriers exist in electronic domain, they are not optical carriers, and such system cannot be qualified as very dense WDM.

In modern optical communication systems, a coherent detection technique is implemented, which provides improved sensitivity compared with traditional direct detection schemes. Typically coherent detection is used with phase-shift-keying (PSK) data transmission. The present invention is also focused on M-PSK, and in the preferred embodiment, QPSK (quadrature PSK) data transmission. However this does not limit the scope of the invention, and various types of data modulation can benefit from the disclosed invention.

In a coherent receiver, the QPSK incoming optical signal is mixed with a strong local oscillators to produce in-phase (I) and in-quadrature (Q) outputs. I and Q components of the output optical signal are converted into electrical signals by a set of photodetectors. In the preferred configuration four balanced photodetectors are used to recover QPSK encoded data.

Data transmission multiplexing light of two orthogonal polarizations via the same optical channel allows doubling the data rate. At the receiver side, the orthogonal polarizations are split by a polarization beam splitter, and the light of each orthogonal polarization is detected separately.

Figure 1:
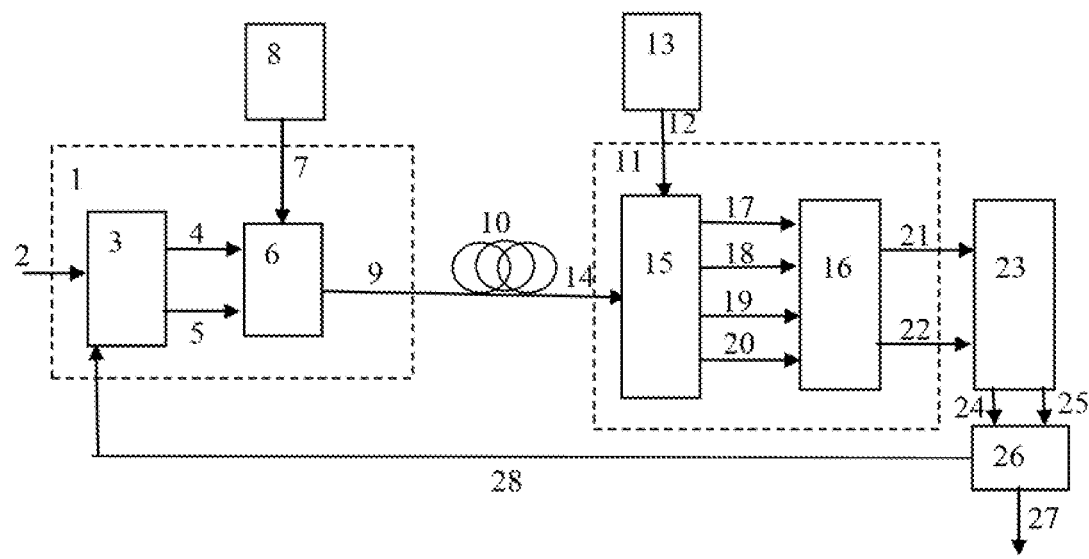
FIG. 1 illustrates a block diagram of a secured communication system, according to one or more embodiments of the invention.

FIG. 1 illustrates an embodiment with point-to-point OFDM data transmission system using coherent detection. In a transmitter 1 a digital data stream 2 enters an OFDM encoder 3, which outputs two analog signals 4 and 5 (I and Q) driving an optical modulator 6. The modulator 6 applies the modulation to a light beam 7 emitted by a light source 8. The signal 9 transmitted via an optical link 10 is received by coherent receivers 11. Local oscillator optical signal 12 coming from a light source 13 enters the coherent receiver 11 and interferes with the optical signal 14. The receiver 11 preferably includes an optical hybrid 15, which is a 90-degrees optical hybrid in the preferred embodiment. In another embodiment it is a 120-degrees optical hybrid. Output optical signals 17-20 from the optical hybrid enter a photodetector unit 16 with at least four balanced photodetectors. I and Q electrical outputs 21, 22 from the photodetector unit enter a set of A/D converters 23, followed by a digital signal processing (DSP) unit 26. The output signal 27 can be used for the further processing or display. A control line 28 provides a control signal for the OFDM encoder to adjust the modulation signal to comply with the transmission characteristics. The components of the optical receiver 11 will be described in more details in the following paragraphs.

In another embodiment, the system operates with the light transmission in two polarization states, and the receiver 11 is a polarization diversity receiver (FIG. 2), and it further comprises the following elements. The signal is received by coherent receivers 11H and 11V after splitting by a polarization beam splitter 29 into two beams 30H and 30V with orthogonal polarization. Local oscillator optical signals 12H and 12V having H and V polarization state coming from a local oscillator light source 13 enter the coherent receivers 11H and 11V and interfere with optical signals 30H, 30V having the corresponding H and V polarization states. Each of the receivers 11H and 11V includes an optical hybrid and a set of photodetectors; it will be described in more details in the following paragraphs. Each of the receivers outputs two electrical signals 21H, 22H and 21V, 22V, converted into digital signals in 23, followed by a digital signal processing unit 26. Output signals 27 represent a series of the decoded data streams that can be displayed or transformed into any format for further presentation and use. In the preferred embodiment each of 10 data streams of 27 has a data rate of 10 Gb/s (100 Gb/s total).

Obviously the system can operate in bi-directional configuration with data transmission in both directions. In this case light sources, located at each end of the link, have double functions. Each light source generates the beam for the data transmission by the transmitter 1 and, at the same time, it provides the local oscillator signal for the receiver 11.

Figure 3:
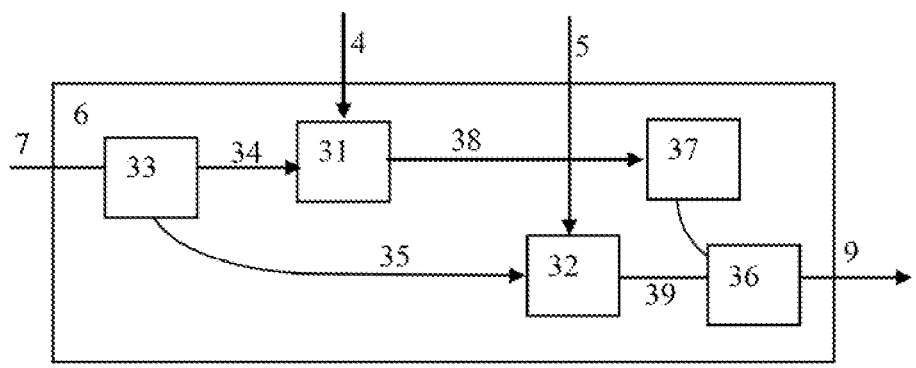
FIG. 3 illustrates the optical modulator schematics.

A variety of the M-PSK data modulation formats can be used in the system and method disclosed in the present invention: QAM, M-QAM, QPSK, BPSK, etc. In one embodiment a quadrature phase shift keying modulation format (QPSK) is implemented. In the preferred embodiment the modulator 6 is a Mach-Zehnder Interferometer (MZI) electro-optic modulator. In the one embodiment shown in FIG. 3 QPSK data is embedded in the system using two separate data modulators, which are the parts of the optical modulator 6. One modulator 31 is used for I component and another modulator 32 is for Q component of the data stream. The optical beam 7 is split by the splitter 33 into two beams 34 and 35, modulated and then combined together by the combiner 36 forming the output beam 9. A phase shift of 90-degrees is introduced by a phase shifter 37 in one of the beams 38 or 39. The output beam 9 is transmitted to the receiver via optical link. The optical link can be a fiber link or a free-space link.

Figure 4:
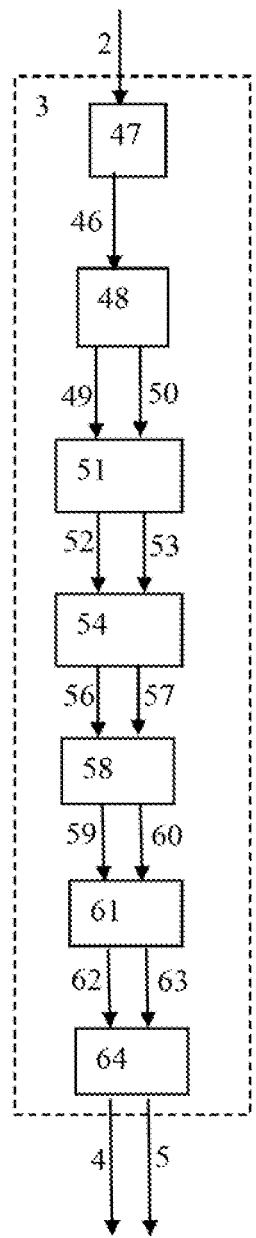
FIG. 4 shows a block diagram of an OFDM encoder, according to one or more embodiments of the invention.

FIG. 4 shows an embodiment of the OFDM encoder 3. This type of encoder was described in details in U.S. patent application Ser. No. 12/045,765 filed Mar. 11, 2008 by the same inventive entity.

A serial data stream 2 (FIG. 4) is converted into a parallel sub-carrier data stream 46 in a serial-to-parallel converter 47. In OFDM, the sub-carrier frequencies are chosen so that the sub-carriers are orthogonal to each other, meaning that cross-talk between the sub-channels is eliminated and inter-carrier guard bands are not required. Parallel output data stream 46 enters a QPSK data encoder 48. Two parallel output signals 49 and 50 correspond to I and Q parts of the QPSK signals of each subcarrier. Inverse Fast Fourier Transform is applied in an IFFT unit 51 to the data streams 49 and 50. Optionally, the OFDM encoder may include a nonlinearity compensation unit 54 that introduces a phase shift to the signals 52 and 53. The nonlinearity unit operation was discussed in more details in the U.S. patent application Ser. No. 12/418,060 by the same inventive entity. A cyclic prefix is added to the signals 56, 57 at a prefix unit 58; the cyclic prefix takes a few last symbols of each data block and repeats them at the beginning of the next block. The scheme is resistant to chromatic dispersion. Two sub-carriers may experience differential delay up to the length of prefix, but the orthogonality between the sub-carriers will be preserved and the data will be recovered at the receiver. The data streams 59, 60 are converted in an parallel-to-serial converter 61, followed by conversion of 62,63 into analog signals in a D/A converter 64. The analog I and Q signals 4 and 5 are applied to the optical modulator 6 as shown in FIG. 1.

For secure data transmission, we proposed to use different encoding format for each subcarrier of the optical carrier. For example, $i^{th}$ subcarrier uses QAM format, $(i+1)^{th}$ subcarrier uses BPSK format, $(i+2)^{th}$ subcarrier uses QPSK format, and so on. Obviously, upon receiving, this signal needs to be decoded, and the data recovered using a key, which represents the information on the type of data encoding in each subcarrier. This key may be known in advance. Alternatively, it may be transmitted to the receiver using a separate channel. In one embodiment this key transmission is performed using quantum encryption to prevent eavesdropping. Such optical communication channel with quantum encryption are described in literature, see, for example, U.S. Pat. No. 7,252,774 or U.S. patent application Ser. No. 10/818,995.

Figure 5:
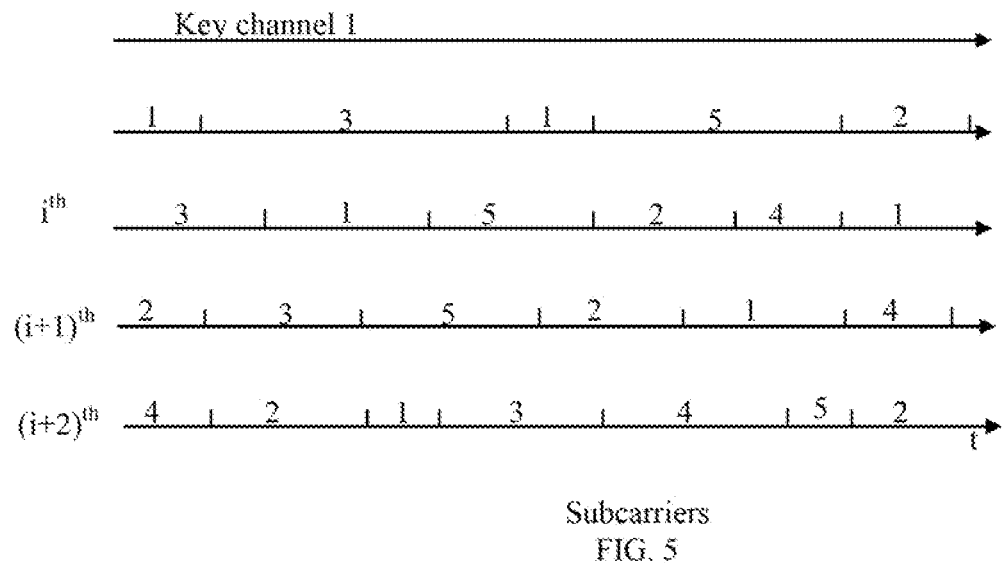
FIG. 5 illustrates subcarriers modulation with data of different formats, according to one or more embodiments of the invention, where, for example, 1-QAM, 2-QPSK, 3-BPSK, 4-OOK and other formats.

In order to enhance the transmission security, it is proposed to change the data modulation format in each subcarrier according to a change key. This format change may occur independently in each subcarrier, so the change sequence of $i^{th}$ subcarrier may be different than the change sequence of $(i+1)^{th}$ subcarrier as shown in FIG. 5, where 1, 2, 3, 4, 5 . . . indicate different data modulation format such as, for example, QAM, QPSK, BPSK, OOK and others.

Figure 6:
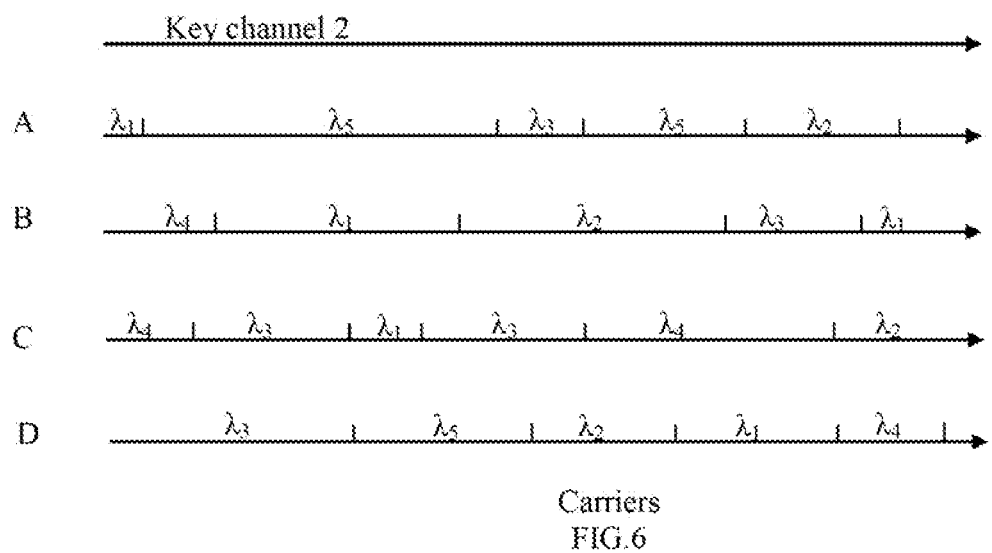
FIG. 6 illustrates different examples of wavelength pseudo-random patterns for the carrier encoding, according to one or more embodiments of the invention, where $\lambda_1$, $\lambda_2$, $\lambda_3$, $\lambda_4$, $\lambda_5$ are different wavelengths.

Frequency hopping in optical communication was disclosed by the same inventive entity in U.S. patent application Ser. No. 12/028,121. Each carrier of the optical data transmission changes frequency according to a predetermined pattern. An example of such embodiment is shown in FIG. 6. A, B, C, and D are different channels of the optical communications system. Each of them changes its frequency (or wavelength λ) according to some key. This key can be predetermined, or, alternatively, it may be transmitted to the receiver using a separate channel, see Key channel 2 in FIG. 6.

Figure 7:
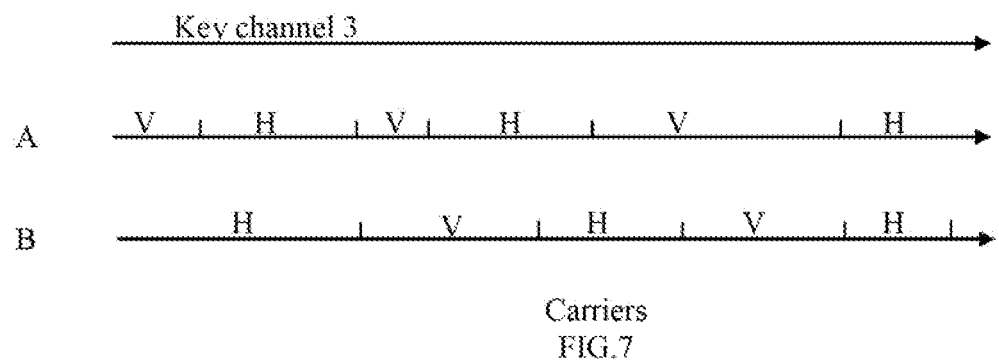
FIG. 7 illustrates polarization scrambling series of plots showing different exemplary encoding techniques used in the multi-dimensional encoding, where the sequence of the physical parameter change is different for the different parameters.

Besides frequency hopping, the system may implement polarization scrambling such as described in the same U.S. patent application Ser. No. 12/028,121 of the same inventive entity. Each channel polarization state may change according to some key, which, again, may be predetermined or transmitted to the receiver. FIG. 7 illustrated polarization scrambling in two carriers A and B, where V and H are orthogonal polarizations.

The change of wavelengths or polarization is independent from the carrier modulation with data. The light beam is transmitted, such as through free space or via a fiber optic network to a receiver, where the information is decoded. Data recovery is impossible without knowledge of the transmission encoding sequence, and it prevents the transmitted information from eavesdropping.

Figure 8:
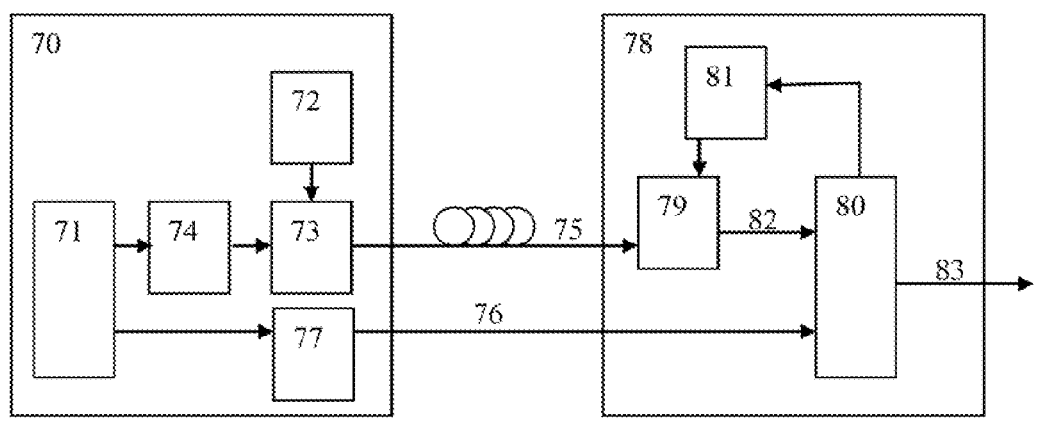
FIG. 8 A block diagram of one embodiment of the system.

A block diagram of one embodiment of the system is shown in FIG. 8. The transmitter unit 70 includes a light source 71, and electronic OFDM unit 72 and an optical modulator 73 for embedding the OFDM signal on the optical carrier. Additionally it may include a frequency hopping unit and a polarization scrambler 74. A secret sequence of keys for all encodings: subcarrier modulation, frequency hopping and polarization scrambling may be transmitted via the same optical link 75 or by a separate channel 76, where 77 is a key transmitter. The key transmitter and the OFDM encoder are controlled by DSP unit (not shown). In one embodiment the key transmitter is quantum encrypted transmitter. In the preferred embodiment the receiving unit 78 includes a coherent receiver 79 with a digital signal processing unit 80. In the coherent receiver the incoming signal is mixed with a local oscillator (LO) signal from the LO source 81 in a coherent mixer such as an optical hybrid, and then the resulting interferometric optical signals are converted into electric currents by one or more PIN photodiodes. LO may be controlled by the DSP unit 80, and the information about the key sequence is sent. An output signal 82 is processed in OFDM decoder in DSP unit 80. The output signal 83 provides the decoded information, which was transmitted over the link. The data may be further displayed or undergo additional processing.

In the preferred embodiment the detector is based on the 90-degree optical hybrid, which was previously disclosed in U.S. patent application Ser. No. 12/045,765 by the same inventive entity. In another embodiment, a 120-degree optical hybrid is implemented such as described in U.S. Pat. No. 7,085,501 by Rickard.

Figure 2:
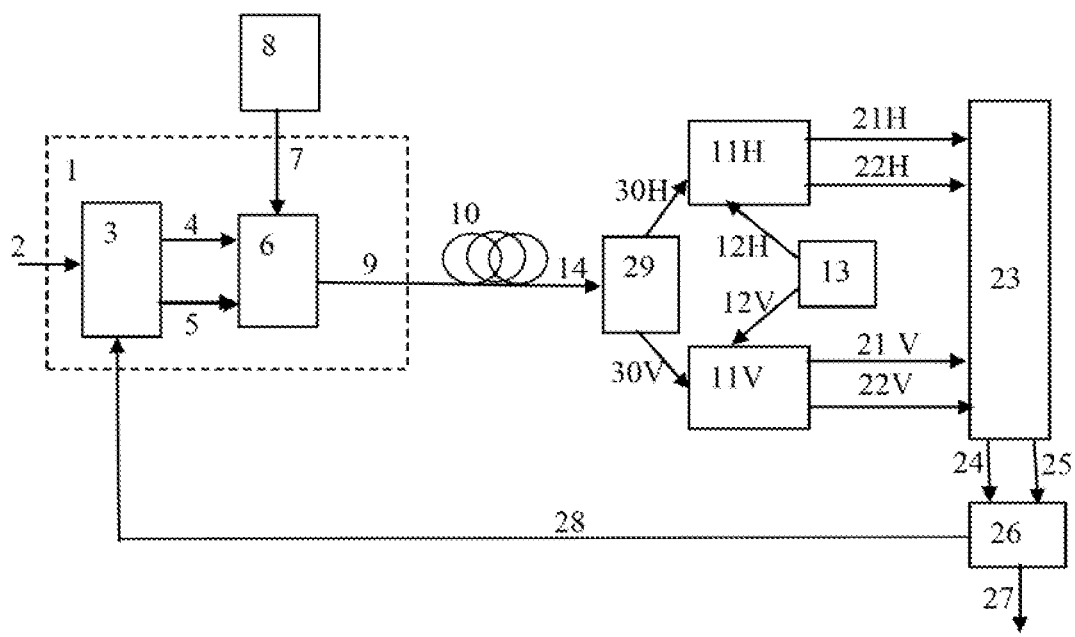
FIG. 2 shows the system operating with light of two polarization states, according to one or more embodiments of the invention.

If the system operated with light in H and V polarization state, then the coherent detector consists of two coherent mixers, one for H-polarization state light and another for V-polarization state light. The local oscillator light source provides the beams of corresponding polarization state. The schematics of the system operation with the light of two polarizations are shown in FIG. 2.

Obviously, the system of FIG. 8 may operate with bi-directional communications and transmit data both from 70 to 78 and from 78 to 70, if additional transmitter and receiver are installed.

The description of a preferred embodiment of the invention has been presented for purposes of illustration and description. It is not intended to be exhaustive or to limit the invention to the precise forms disclosed. Obviously, many modifications and variations will be apparent to practitioners skilled in this art. It is intended that the scope of the invention be defined by the following claims and their equivalents.

What is claimed is:

1. A system for secure data transmission via optical link, comprising: an optical transmitter for orthogonal frequency division multiplexed (OFDM) communications, wherein each channel carrier has multiple subcarriers, each subcarrier being individually encoded with data and a data encoding format is different for different subcarriers; the transmitter is sending data to an optical receiver; an output electrical signal from the optical receiver is processed in a digital signal processing (DSP) unit to recover data from each subcarrier, wherein for security purposes the data encoding format of each subcarriers changes in time according to a pattern.

2. The system of claim 1, wherein the encoding formats of the subcarriers are stored in a DSP unit memory.

3. The system of claim 1, wherein a key for the subcarrier encoding change is transmitted from the transmitter to the receiver via a separate key channel.

4. The system of claim 3, wherein the key channel implements quantum encryption for transmission of the key sequence.

5. The system of claim 1, wherein the encoding format change occurs independently in each subcarrier.

6. The system of claim 1 adapted to operate with data transmission using an optical beam having two polarization states.

7. The system of claim 1, wherein the data encoding format is selected from PSK formats, QAM or OOK formats and mixture of thereof.

8. A system for secure data transmission via optical link, comprising: an optical transmitter for orthogonal frequency division multiplexed (OFDM) communications, wherein each channel carrier has multiple subcarriers, each subcarrier being individually encoded with data and a data encoding format is different for different subcarriers; the transmitter is sending data to an optical receiver; an output electrical signal from the optical receiver is processed in a digital signal processing (DSP) unit to recover data from each subcarrier, wherein the optical receiver configured to receive an encoded OFDM signal and to mix it with a signal from a local oscillator, and wherein the optical carrier changes its polarization state according to a sequence of polarization change keys, and the local oscillator has a polarization state corresponding to the polarization state of the incoming carrier.

9. The system of claim 8, wherein the optical receiver performs homodyne or heterodyne mixture of the encoded OFDM with the local oscillator signal.

10. The system of claim 8, wherein the local oscillator is a separate device from a source device generating the encoded signal.

11. The system of claim 8, wherein the optical receiver consists of two 90-degrees optical hybrids, one for H-polarization light and one for V polarization light and is adapted for operation with the optical signal of two polarization states.

12. A system for secure data transmission via optical link, comprising: an optical transmitter for orthogonal frequency division multiplexed (OFDM) communications, wherein each channel carrier has multiple subcarriers, each subcarrier being individually encoded with data and a data encoding format is different for different subcarriers; the transmitter is sending data to an optical receiver; an output electrical signal from the optical receiver is processed in a digital signal processing (DSP) unit to recover data from each subcarrier, wherein the optical receiver configured to receive an encoded OFDM signal and to mix it with a signal from a local oscillator, further comprising means for changing the carrier wavelength according to a sequence of wavelength change keys, and the local oscillator has a wavelength corresponding to the wavelength of the incoming carrier.

13. The system of claim 12, wherein the optical carrier changes its polarization state according to a sequence of polarization change keys, and the local oscillator has a polarization state corresponding to the polarization state of the incoming carrier.

14. The system of claim 1, wherein the optical link is a fiber or a free space link.

15. A method of optical secure communication, comprising: transmitting data using an optical carrier from a transmitter to an optical receiver, the optical carrier has N subcarriers, N>1, the subcarriers forming an orthogonal frequency division multiplexed (OFDM) optical signal; each subcarrier being individually encoded with data and a data encoding format is different for different subcarriers; receiving the OFDM encoded signal using the optical receiver, where it is mixed with a signal from a local oscillator; an output electrical signal from the optical receiver is processed in a digital signal processing (DSP) unit to recover data from each subcarrier, wherein for security purposes the data encoding format of each subcarriers changes in time according to a key pattern.

16. The system of claim 15, wherein a key for the subcarrier encoding change is transmitted from the transmitter to the receiver via a separate key channel.

17. The system of claim 16, wherein the key channel implements a quantum encryption for transmission of the key sequence.

* * * * *